United States Patent Office 3,153,040
Patented Oct. 13, 1964

3,153,040
PIPERAZINE COMPLEXES OF 6-CHROMANOLS
Charles D. Robeson and Donald R. Nelan, Rochester, N.Y., assignors to Eastman Kodak Company, Rochester, N.Y., a corporation of New Jersey
No Drawing. Filed Apr. 26, 1962, Ser. No. 190,249
18 Claims. (Cl. 260—268)

This invention relates to the chemical arts. More particularly, it relates to that branch of organic chemistry having to do with chromanes and specifically 6-chromanols.

6-chromanols, sometimes called 6-hydroxychromanes, are organic chemical compounds having a molecular structure according to the general formula:

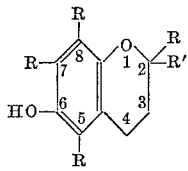

wherein each R is a radical independently selected from the group consisting of hydrogen and methyl radicals and R' is a radical selected from the group consisting of hydrogen and aliphatic, saturated and unsaturated hydrocarbon radicals. An important group of 6-chromanols are the tocopherols, the more important of which having a molecular structure according to the foregoing general formula wherein the R' is an aliphatic, saturated hydrocarbon radical of 16 carbon atoms. These tocopherols conform to the general formula:

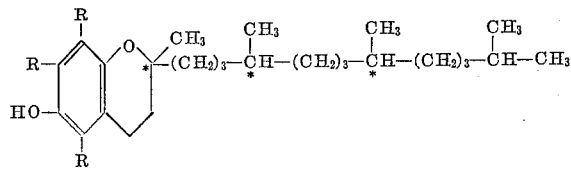

wherein each R is a radical independently selected from the group consisting of hydrogen and methyl radicals. The tocopherol wherein each R is a methyl group is commonly referred to as α-tocopherol. The tocopherol wherein the R's at the 5 and 8 positions of the molecule are methyl radicals and R at the 7 position is a hydrogen radical is called β-tocopherol. The tocopherol wherein the R's at the 7 and 8 positions of the molecule are methyl radicals and R at the 5 position is a hydrogen radical is γ-tocopherol. Delta tocopherol is characterized by the R at the 8 position being a methyl radical and R's at the 5 and 7 positions being hydrogen radicals. The tocopherol wherein the R's at the 5 and 7 positions of the molecule are methyl radicals and the R at the 8 position is a hydrogen radical is zeta-tocopherol.

In 6-chromanol molecules wherein the R and R' radicals are different, the carbon atom at the 2 position is asymmetric and optical isomerism exists. Optical isomerism is a characteristic of the tocopherols wherein not only is there an asymmetric carbon atom at the 2 position of the molecules but also there are asymmetric carbon atoms at the 4' and 8' positions of the side chain (R'). In the formula these asymmetric carbon atoms are indicated by asterisks. In naming these compounds, when it is desired herein to designate the particular optical isomer involved, the position numbers of the asymmetric carbon atoms and the direction of optical rotation associated with each of these asymmetric carbon atoms are set out before the name of the compound. Examples of this nomenclature are:

2d,4'l,8'd-α-tocopherol
2l,4'd,8'd-α-tocopherol
2d,4'l,8'd-β-tocopherol
2l,4'd,8'l-β-tocopherol Except for a few instances in the following disclosure, there generally is no need to designate the optical rotation effect of each asymmetric carbon atom of the molecules of the particular compound involved. Generally, except for the few instances, all that is necessary herein is to designate the net optical effect as is generally done in the art, for example: d-α-tocopherol and dl-α-tocopherol (a racemic mixture of optically active isomers, which mixture has no specific rotation).

This invention is based on the discovery that piperazine compounds selected from the group consisting of piperazine and C-methyl and C-ethyl substituted piperazines react with 6-chromanols in the absence of water to form crystallizable complexes. These complexes constitute a new class of compounds which are generically referred to herein as the piperazine complexes of 6-chromanols. This discovery is particularly significant in view of the fact that attempts to form crystallizable complexes from some thirty other amines including N-methylpiperazine, morpholine, N-methyl morpholine and the like and either d-α- or d-γ-tocopherol were not successful. This discovery is also significant in view of the fact that such chemicals as digitonin, desoxycholic acid, urea, oxalic acid and succinic acid, which are known complexing agents for other hydroxylic compounds, fail to form crystalline complexes with tocopherols.

This invention in one aspect comprises these piperazine complexes of 6-chromanols. Generally, the molecular equivalent ratio of the piperazine compound to the 6-chromanol in these complexes is 1:2. They are represented by the formula:

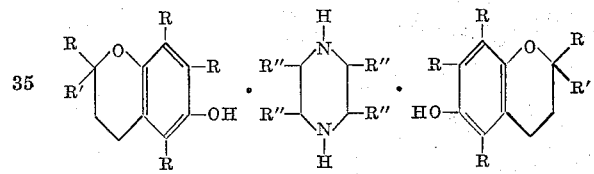

wherein each R is a radical independently selected from the group consisting of hydrogen and methyl radicals, each R' is a radical independently selected from the group consisting of hydrogen and aliphatic, saturated and unsaturated hydrocarbon radicals and each R" is a radical independently selected from the group consisting of hydrogen, methyl and ethyl radicals.

The complexes of this invention at 20° C. range from liquid to solid. As a class, they have a melting point and in the solid state are crystalline. Generally, they are highly soluble at 20° C. in the usual, inert, organic solvents but of only limited solubility at −20° C. in these solvents. In this regard, they exhibit selective or preferential crystallization from crystallization solvents containing in solution other crystallizable compounds including other complexes of this invention. This selective or preferential crystallization feature extends even to mixtures of two piperazine complexes of 6-chromanols, which complexes differ from one another only in that the 6-chromanol portion of one complex is a simple optical isomer of the 6-chromanol portion of the other complex. By simple optical isomer is meant that the isomerism is only at one asymmetric carbon atom position and not at more than one asymmetric carbon atom position if more than one asymmetric carbon atoms are present. For example, two 6-chromanols which differ only in that one is a simple optical isomer of the other are:

2d,4'd,8'd-α-tocopherol
2l,4'd,8'd-α-tocopherol

As a matter of fact, these two 6-chromanols are the compounds which make up the racemic mixture of α-tocopherol, or dl-α-tocopherol, when such is synthesized from natural phytol and trimethylhydroquinone. By selective or preferential crystallization is meant that more of one crystallizable compound than of another is crystallized from a solution comprising the two. Another interesting and useful property of these complexes is that upon admixture with water they decompose to the original piperazines and 6-chromanols. The compounds of this class in general have antioxidant properties and, therefore, are useful as antioxidants for anhydrous, oxidizable substances such as, for example, fats and oils. The piperazine complexes of $\alpha$-tocopherol, $\beta$-tocopherol and $\gamma$-tocopherol have, in addition, both vitamin E activity to a substantial extent and anthelmintic activity. Hence, these particular complexes have utility in veterinary medicine.

This invention is another aspect comprises a process for making these complexes. This process broadly comprises admixing a piperazine compound selected from the group consisting of piperazine and C-methyl and C-ethyl substituted piperazines with a 6-chromanol in the absence of water. The expression "C-methyl and C-ethyl substituted piperazines" refers to piperazines having in their molecules the methyl and ethyl substituents attached only to nuclear carbon atoms and not to nuclear nitrogen atoms. Typical examples of a piperazine compound are:

Piperazine
2-methylpiperazine
Trans-2,5-dimethylpiperazine
cis-2,5-dimethylpiperazine
2,3,5-trimethylpiperazine
2,3,5,6-tetramethylpiperazine Other examples of a piperazine compound include the C-ethyl substituted piperazines such as 2-ethylpiperazine, and the C-methyl, C-ethyl substituted piperazines such as 2,5-dimethyl-3,6-diethylpiperazine. Typical examples of a 6-chromanol are:

6-chromanol
2-methyl-6-chromanol
2,2,5,7,8-pentamethyl-6-chromanol
$d$-$\alpha$-tocopherol
$d$-$\gamma$-tocopherol
$d$-zeta-tocopherol In preferred embodiments of this process of this invention admixing of the piperazine compound and the 6-chromanol takes place in a liquid medium which at the temperature of admixture and crystallization temperature is chemically inert relative to the piperazine compound, the 6-chromanol and the resulting complex. It is preferred that the liquid medium be a crystallization solvent, that is, a solvent in which at admixing temperature the complex is highly soluble and at a different temperature, usually a lower temperature, the complex is substantially less soluble. Generally, under these admixing conditions, the piperazine compound and 6-chromanol are also highly soluble at admixing temperature in the liquid medium. A suitable liquid medium is acetone. Other suitable organic solvents include hexane, esters, dialkyl ethers and the like.

In specific embodiments of this process of this invention the piperazine complex of a 6-chromanol, which is formed in and dissolved by the anhydrous liquid medium at admixing temperature, is separated from the liquid by lowering the temperature of the liquid medium or solution to a temperature at which substantial crystallization of the complex takes place and then, after the desired extent of crystallization has occurred, removing the crystallized complex from the liquid medium. Such removal is by conventional ways such as, for example, filtration, decantation, centrifugation and the like. In these embodiments of this process of this invention a typical, preferred, admixing temperature is 20° C. and a typical, preferred, admixing temperature is —20° C. However, higher and lower admixing temperatures and higher and lower crystallization temperatures can be employed. In the case of acetone a practical range of admixing temperatures is from about 0 to about 55° C. while a practical range of crystallization temperature is from about —40 to about 0° C.

This invention in another aspect comprises a process for separating a 6-chromanol and particularly a tocopherol from a mixture. This process is particularly useful in the purification of tocopherol products. In this regard the tocopherols are naturally occurring substances found in vegetable oils. They are also synthesized by condensing phytol or isophytol with a compound of the group consisting of hydroquinone and methyl substituted hydroquinones such as mono-, di- and trimethylhydroquinones. Whether produced from natural sources or by synthesis, at some stage of their processing they are present in so-called concentrates. Natural tocopherol concentrates frequently contain glycerides, sterols, hydrocarbons and the like, which occur in the vegetable oil along with the tocopherols. Synthetic tocopherol concentrates usually contain by-products of the condensation reaction and unchanged starting materials or reactants. The final stages of purification of tocopherols from both types of concentrates are difficult to carry out because the tocopherols are oils which do not crystallize readily. Esters of tocopherols are sometimes solids at normal temperatures and can be crystallized. Hence, crystallizable esters of tocopherols are sometimes employed to effect purification. However, this requires the step of esterification and work-up steps as well as the step of saponification to recover the purified tocopherols. Under the concepts of this invention, these steps are avoided.

In this aspect of the invention purification is effected by (1) admixing with the concentrate in the absence of a significant concentration of water but in a solvent of the aforementioned kind at least one piperazine compound selected from the group consisting of piperazine and C-methyl and C-ethyl substituted piperazines, (2) cooling the resulting solution to a temperature at which a substantial proportion of the resulting piperazine compound complex of a tocopherol crystallizes, (3) separating, after a substantial proportion of a piperazine compound complex of a tocopherol has crystallized, the crystallized product from the solvent and (4) admixing the crystallized product thus obtained with water, whereby decomposition of the complex or complexes takes place. Usually it is preferred to wash the thus released tocopherol or tocopherols with water to remove the released piperazine compound and then dry the thus purified tocopherol or tocopherols product. It should be noted that sterols and piperazines form highly insoluble, crystalline complexes. Hence, when treating according to this invention tocopherol concentrates containing sterols, during the practice of the first two steps, substantially all of the piperazine compound complexes of the sterols will rapidly crystallize out of solution before any significant crystallization of the piperazine compound complexes of the tocopherol or tocopherols takes place. By removing this initial crop of crystals before any significant crystallization of the piperazine compound complexes of the tocopherol or tocopherols takes place, separation of sterols from tocopherols is thereby effected. In this regard, while this aspect of this invention has been described relative to the purification of tocopherol concentrates, it broadly encompasses the purification of 6-chromanol concentrates generally.

This invention has still another aspect in that it comprises a process for separating a 6-chromanol from a homologous 6-chromanol. A specific embodiment of this particular process, for example, involves the separation of $\gamma$-tocopherol from delta-tocopherol. The steps of this process comprise admixing under substantially anhydrous conditions in a solvent of the aforementioned kind a piperazine compound and the mixture of the two homologs. The temperature of the resulting solution is reduced to that whereat substantial crystallization takes place. Separation of the crystals from the solution is performed when crystallization is substantially complete. The crystals predominate in the complex of the piperazine compound and one of the 6-chromanols. At this point the crystals can be recrystallized as many times as desired until the desired degree of purity is achieved. The crystals are then admixed with water to decompose the complex into the 6-chromanol and the piperazine compound, and the 6-chromanol is separated from the water and the piperazine compound.

This invention in still another aspect comprises a process for separating a 6-chromanol from a simple optical isomer thereof. Such a process is useful for resolving a racemic mixture of simple optical isomers having a 6-chromanol molecular structure. Indeed, a specific embodiment of this process comprises the resolution of the synthetic or $dl$-α-tocopherol that is a racemic mixture of two simple optical isomers, for example, such as in the case of the synthetic or $dl$-α-tocopherol product derived from natural phytol and trimethylhydroquinone. Such a process is of value because synthetic or $dl$-α-tocopherol, a racemic mixture, has less vitamin E potency than natural or $d$-α-tocopherol. This fact is reflected in The National Formulary, Eleventh Edition, on page 459, which sets out the following equivalents, namely:

1 milligram of $d$-α-tocopherol
=1.49 International Units of vitamin E
1 milligram of $dl$-α-tocopherol
=1.1 International Units of vitamin E Thus, $dl$-α-tocopherol has only about 73.8% of the biological activity of an equal quantity of $d$-α-tocopherol. The reason for this difference in biological activity is apparently the $l$-α-tocopherol content of $dl$-α-tocopherol. Apparently, $l$-α-tocopherol has less biological activity than $d$-α-tocopherol. Hence, in order to obtain a vitamin E product of maximum potency from $dl$-α-tocopherol, it is necessary to resolve the mixture, to separate the $d$-α-tocopherol from the $l$-α-tocopherol. One process heretofore proposed for carrying out such a separation is disclosed in the U.S. Patent No. 2,215,398, to Karrer. This process, however, involves the step of esterification with an optically active acid and, after separation of the esters has taken place, the step of saponification to obtain the $d$-α-tocopherol. Under the concepts of this invention these steps are avoided.

The process of this invention for resolving a synthetic of $dl$-α-tocopherol that is a mixture of two simple optical isomers is based on the fact that at the temperature of crystallization more of the piperazine complex of the $d$-isomer is crystallized than the piperazine complex of the $l$-isomer. Thereafter, upon separating the crystals and mother liquor and subjecting the crystals to recrystallization and the mother liquor to further crystallization conditions, the crystal fractions thereby obtained generally predominate in the piperazine complexes which are predominant in the solutions from which they are crystallized.

This process comprises a number of steps. The first step is admixing at least one piperazine compound selected from the group consisting of piperazine and C-methyl and C-ethyl substituted piperazines with the $dl$-α-tocopherol in the absence of a substantial concentration of water but in a solvent of the aforementioned kind. The second step comprises cooling the resulting solution to a temperature at which a substantial proportion of the piperazine complex of $d$-α-tocopherol crystallizes. The third step is separating after a substantial proportion of said piperazine complex has crystallized the crystallized product from the solution. At this point it should be noted that because some of the piperazine complex of the $l$-α-tocopherol also crystallizes at the same time as the piperazine complex of $d$-α-tocopherol, although at a slower rate, the crystallized product while rich in the piperazine complex of the $d$-α-tocopherol also contains the piperazine complex of the $l$-α-tocopherol.

Hence, in one embodiment of this process the next steps comprise dissolving the crystalline product in fresh solvent or in solvent from a succeeding recrystallization step if practiced, cooling as in the second step, and then separating as in the third step. This portion of the process can be repeated as many times as necessary to obtain a crystalline product of the desired purity. The product is then admixed with water to decompose the complex and release the $d$-α-tocopherol.

On the other hand, in another embodiment of this process instead of recrystallization of the crystalline product, the product is admixed with water and the released $d$-α-tocopherol product, an oil, is treated according to the first three steps. This procedure can be repeated as many times as necessary to obtain $d$-α-tocopherol product free to the desired extent of $l$-α-tocopherol.

Of course, in other embodiments of this process both procedures can be employed.

In all embodiments of this process it is preferred practice to wash the $d$-α-tocopherol product, particularly the final product, with water to remove therefrom residual piperazine compound and then to dry the washed product.

When it is desired to recover the $l$-α-tocopherol in this resolution process, several procedures can be employed. In one procedure the mother liquor in the first step, augmented if desired by the motor liquors from the other crystallization steps, is maintained at a crystallization temperature until a substantial portion of the piperazine complex of $l$-α-tocopherol has crystallized, the crystalline product thereby obtained is separated from the solvent, and the product thereafter admixed with water to decompose the complex and release the $l$-α-tocopherol. In another procedure the solvent is removed as by vacuum evaporation from the mother liquor, whether augmented or not, and the residue admixed with water to decompose the piperazine complex of $l$-α-tocopherol and release the tocopherol.

This invention is further illustrated by the following examples of various aspects thereof, which include specific embodiments of the invention. This invention is not limited to these specific embodiments unless otherwise indicated.

EXAMPLE 1

This example illustrates a complex of piperazine and 2,2,5,7,8-pentamethyl-6-chromanol, and its preparation.

To a solution of 2.2 grams (0.01 mole) of 2,2,5,7,8-pentamethyl-6-chromanol (which has a typical melting point of 94–95° C.) in 10 milliliters of acetone at 20° C., there is admixed 0.43 gram (0.005 mole) of piperazine. The resulting solution is cooled to 5° C. and held at this temperature for 24 hours. A white crystalline solid results. The mother liquor is decanted from the crystals and residual solvent thereafter removed therefrom by distillation, whereby there is obtained a crystalline complex of piperazine and 2,2,5,7,8-pentamethyl-6-chromanol. A typical yield of this product is 1.8 grams (0.003 mole). The product typically has a melting point of 121–122° C. and in ethanol an ultraviolet absorption measurement of $$E_{1\,cm.}^{1\%}\ (292\ m\mu) = 124$$

The mole ratio of the 6-chromanol to the piperazine in the product is 2:1.

EXAMPLE 2

This example illustrates the preparation of a crystalline complex of piperazine and $d$-α-tocopherol.

5.85 grams (about 0.01 mole of $d$-α-tocopherol) of a $d$-α-tocopherol concentrate typically having in ethanol an ultraviolet absorption value of $$E_{1\,cm.}^{1\%}\ (292\ m\mu) = 71.9$$

is dissolved in acetone and admixed with a solution of 0.9 gram (0.01 mole) of piperazine in 10 milliliters of acetone. The resulting solution is cooled to −20° C. and held at this temperature for 24 hours, during which time a precipitate of crystalline solids is formed. The mother liquor is decanted from the solids and residual mother liquor removed therefrom by evaporation. The product thus obtained is the complex of piperazine and $d$-$\alpha$-tocopherol, the mole ratio of piperazine to tocopherol being 1:2. The product typically has a melting point of 52–54° C. and has in ethanol an ultraviolet absorption value of $$E_{1\,cm.}^{1\%} \ (292 \ m\mu) = 68.6$$

EXAMPLE 3

This example illustrates a complex of $d$-$\alpha$-tocopherol and 2-methylpiperazine, and its preparation.

To a solution of 2 grams (0.0046 mole) of $d$-$\alpha$-tocopherol in 8 milliliters of acetone is added a solution of 0.23 gram (0.0023 mole) of 2-methylpiperazine in 5 milliliters of acetone. The resulting solution is cooled to —20° C. and held at this temperature for 24 hours. During this time a white crystalline solid precipitates. The mother liquor is decanted from the precipitate and occluded solvent removed from the precipitate by distillation, whereby a viscous oil is obtained which solidifies on cooling to 5° C. The solid product thus obtained is the complex of 2-methylpiperazine and $d$-$\alpha$-tocopherol with the mole ratio of 2-methylpiperazine to the tocopherol being 1:2. A typical yield of this product is 1.5 grams (0.0016 mole). The product typically melts at 22–24° C. A typical ultraviolet absorption spectrum of the product in ethanol is $$E_{1\,cm.}^{1\%} \ (291 \ m\mu) = 65.7$$

EXAMPLE 4

This example illustrates the preparation of a complex of $d$-$\alpha$-tocopherol and trans-2,5-dimethylpiperazine.

A solution of 2.0 grams (0.0046 mole) of $d$-$\alpha$-tocopherol in 8 milliliters of acetone and a solution of 0.26 gram (0.0023 mole) of trans-2,5-dimethylpiperazine in 10 milliliters of acetone are admixed. The resulting solution is concentrated to about 10 milliliters by evaporation under a stream of nitrogen. The concentrate is then cooled to —20° C., and held at this temperature for 24 hours, whereby a white, crystalline solid is precipitated. The mother liquor is decanted from the precipitate and occluded solvent removed by distillation. The residue is the desired product, the complex of $d$-$\alpha$-tocopherol and trans-2,5-dimethylpiperazine with the mole ratio of the tocopherol to the piperazine being 2:1. This product typically melts at 24–26° C. but resolidifies on cooling under a stream of cold tap water. The product in ethanol typically has an ultraviolet absorption value of $$E_{1\,cm.}^{1\%} \ (291 \ m\mu) = 65$$

EXAMPLE 5

This example illustrates the preparation of a complex of $d$-$\gamma$-tocopherol and piperazine.

An acetone solution of 4.2 grams (0.01 mole) of substantially pure $d$-$\gamma$-tocopherol obtained from soybean oil (having in ethanol an ultraviolet absorption value of $$E_{1\,cm.}^{1\%} \ (296 \ m\mu) = 92)$$

is admixed with a solution of 0.43 gram (0.005) piperazine in acetone, cooled to —20° C. and held at this temperature for 24 hours. During this time a crystalline product forms in the solution. The product is separated from the mother liquor. It is the complex of a $d$-$\gamma$-tocopherol and piperazine, the mole ratio of the tocopherol to the piperazine being 2:1. A typical melting point of the product is 60–61° C. A typical ultraviolet absorption value of the product in ethanol is $$E_{1\,cm.}^{1\%} \ (296 \ m\mu) = 84.5$$

This example illustrates the preparation of a crystalline complex from $dl$-zeta-tocopherol and piperazine.

$dl$-Zeta-tocopherol is synthesized, as described in Nature 179, 418 (1957), from 2,6-dimethyl hydroquinone and isophytol, and purified by chromatography. 7.68 grams (0.018 mole) of the purified $dl$-zeta-tocopherol is dissolved in 40 milliliters of acetone containing 0.79 gram (0.009 mole) of piperazine. Upon cooling the solution thus obtained to —20° C. and holding the solution at this temperature for 24 hours a white crystalline precipitate results. The precipitate is filtered off and dried under vacuum. Typically, there is thereby obtained 5.6 grams of a crystalline solid having a melting point of 39–42° C. Recrystallization of the solid from three volumes of acetone gives typically 4.26 grams (0.005 mole) of product. This product typically has a melting point of 40–42° C. It comprises the piperazine complexes of $d$- and $l$-zeta-tocopherol with the mole ratio of the tocopherol to piperazine in each complex being 2:1.

EXAMPLE 7

This example illustrates the utility as an antioxidant of the complex of $d$-$\alpha$-tocopherol and piperazine, which complex is prepared according to Example 2.

One liter samples of diethyl ether, one sample containing no additive and the other samples containing in solution the additives indicated in the following Table I at the indicated concentrations are prepared and stored in stoppered brown bottles in the dark at 20° C. for 60 days. At the end of this time aliquot portions of the samples are taken out and assayed for peroxides. Typically little or no peroxides are found in any of the samples. Thereafter, the bottles are exposed to ordinary light as by being placed on an open shelf in a normally lit room and after 11 days and 25 days of this exposure aliquot portions of the samples are taken and assayed for peroxides. Typical results are as follows:

*Table I*

| Additive | Concentration in Percent by Weight | Concentration in Molecular Equivalents | Peroxide Value After a Total Storage of— | |
|---|---|---|---|---|
| | | | 71 days | 85 Days |
| None | | | 4.95 | 16.7 |
| Piperazine | 0.0005 | 0.00007 | 2.58 | 5.76 |
| $d$-$\alpha$-tocopherol | 0.0045 | 0.00010 | 0.53 | 0.98 |
| Complex of Piperazine and $d$-$\alpha$-tocopherol | 0.0050 | 0.00005 | 0.10 | 0.68 |

These typical data demonstrate that the complex of $d$-$\alpha$-tocopherol and piperazine is an effective antioxidant for diethyl ether. Moreover, these typical data indicate that the complex of $d$-$\alpha$-tocopherol and piperazine has an antioxidant effect that is substantially greater than the antioxidant effects of either piperazine or $d$-$\alpha$-tocopherol at slightly greater molecular equivalent concentrations and that this effect is substantially greater than the sum of the effects of piperazine and $d$-$\alpha$-tocopherol when each effect is considered as the multiplication factor by which the peroxide value of the control or sample without an additive exceeds the peroxide value of the corresponding sample with additive.

EXAMPLE 8

This example illustrates the purification of a substantially anhydrous, natural $d$-$\alpha$-tocopherol concentrate according to a process of this invention.

9.39 grams of a $d$-$\alpha$-tocopherol concentrate, obtained from soybean oil, containing about 85% by weight of $d$-$\alpha$-tocopherol as determined by infrared assay and typically being reddish in color is dissolved in 20 milliliters of acetone. To this solution is added a solution of 0.9 gram of piperazine in 10 milliliters of acetone. The resulting solution is cooled to —20° C. and held at this temperature for 24 hours. During this time a crystalline solid precipitates. The mother liquor is decanted from the precipitated crystalline solids and the solids are dissolved in 100 milliliters of diethyl ether. The ether solution is washed three times with 50 milliliter portions of water. After drying the ether solution over sodium sulfate, the ether is evaporated, leaving a light yellow oil consisting of a purified d-α-tocopherol product. A typical yield of this product is 5.85 grams. A typical ultraviolet absorption value for this product in ethanol is $$E_{1\ cm.}^{1\%} (292\ m\mu) = 71.9$$

EXAMPLE 9

This example illustrates the purification according to a process of this invention of a synthetic α-tocopherol concentrate.

15 grams of a substantially anhydrous, synthetic α-tocopherol concentrate (a typical ultraviolet absorption measurement in ethanol is $$E_{1\ cm.}^{1\%} (292\ m\mu) = 51.1$$

while a typical Emmerie-Engel assay is 71.6% by weight α-tocopherol) is dissolved in 50 milliliters of acetone at 20° C. To the solution thus obtained 1 gram of piperazine is admixed therewith and the mixture warmed slightly to effect solution of the piperazine. The resulting solution is then cooled to −20° C., held at this temperature for 24 hours, cooled further to −40° C. and held at this temperature for approximately 1 hour. This results in a precipitate of crystalline solids. These precipitated crystalline solids are separated from the mother liquor by filtration followed by washing with cold acetone.

The crystals are dissolved in diethyl ether and the resulting solution washed several times with water to decompose the complexes and remove the piperazine. The ether solution is then dried over anhydrous sodium sulfate, filtered and the ether removed by distillation. The product thereby obtained, an oil, is an enriched, α-tocopherol cencentrate. A typical yield of the product is 9.0 grams. A typical ultraviolet absorption value of the product in ethanol is $$E_{1\ cm.}^{1\%} (292\ m\mu) = 69.9$$

A typical Emmerie-Engel assay of the product is 90.2% by weight α-tocopherol.

The mother liquor, after it has been separated from the precipitated solids, is washed with water to break up any complex contained therein and to remove piperazine. After drying the resulting solution and distilling off the acetone there is obtained a residue of solids representing the remainder of the tocopherol and the bulk of the impurities. A typical yield of residue under these conditions is 6 grams. An ultraviolet absorption measurement on the residue in ethanol gives a typical value of $$E_{1\ cm.}^{1\%} (288\ m\mu) = 44.5$$

An Emmerie-Engel assay of the residue gives a typical value of 47% by weight α-tocopherol.

EXAMPLE 10

This example illustrates the purification according to a process of this invention of a d-γ-tocopherol concentrate.

44 grams of a substantially anhydrous, d-γ-tocopherol concentrate obtained from soybean oil, which concentrate typically is a red oil having inethanol an ultraviolet absorption value of $$E_{1\ cm.}^{1\%} (295\ m\mu) = 90$$

and containing 81% by weight d-γ-tocopherol mixed with 10–15% by weight d-α-tocopherol and d-delta-tocopherol as determined by infrared assay is dissolved in 150 milliliters of acetone. To the resulting solution is admixed at 20° C. a solution of 4.3 grams of piperazine in 150 milliliters of acetone. The solution thus obtained is cooled to −20° C. and held at this temperature for 24 hours. During this time a precipitate of crystalline solids forms. The mother liquor is decanted from the crystalline solids and the solids washed with a 50 milliliter portion of cold acetone. A sample of the solids in the absence of acetone has a typical melting point of 55–58° C. The solids are dissolved in 50 milliliters of petroleum ether and the resulting solution washed in succession with three 200 milliliter portions of water. After drying the solution over anhydrous sodium sulfate and removing the petroleum ether by evaporation there is obtained a light yellow oil, which oil is a purified d-γ-tocopherol concentrate. A typical yield of the oil is 25 grams.

The light yellow oil is admixed at 20° C. with 2.5 grams of piperazine dissolved in 175 milliliters of acetone. The temperature of the resulting solution is lowered to −20° C. and maintained thereat for 24 hours, whereby a crystalline precipitate forms. The mother liquor is decanted from the precipitate and the precipitate washed with 50 milliliters of cold acetone. The washed precipitate is dissolved in 50 milliliters of petroleum ether and the solution thus formed is washed three times with 200 milliliter portions of water. The washed petroleum ether solution is dried over anhydrous sodium sulfate and the petroleum ether then removed by evaporation. There is thereby obtained an oil which typically by infrared assay is found to be substantially pure d-γ-tocopherol and which in ethanol has a typical ultraviolet absorption value of $$E_{1\ cm.}^{1\%} (296\ m\mu) = 92$$

A typical yield of the oil under these conditions is 16.5 grams.

EXAMPLE 11

This example illustrates the separation according to a process of this invention of a d-γ-tocopherol concentrate from a mixture of d-γ-tocopherol and d-delta-tocopherol.

12 grams of a tocopherol concentrate containing a mixture of d-γ-tocopherol and d-delta-tocopherol at typical concentrations of 34 and 33% by weight, respectively, are dissolved in 20 milliliters of acetone. To this solution there is admixed at 20° C. a solution of 0.8 gram of piperazine in 20 milliliters of acetone. The resulting solution is cooled to −20° C. and held at this temperature for 24 hours. During this period of time a crop of crystals forms in the solution. The mother liquor is decanted from the crystals and the crystals are then dissolved in diethyl ether. The ether solution is washed several times with water, whereby the complexes present are decomposed and the released piperazine removed.

The washed ether solution is then dried over anhydrous sodium sulfate and the ether removed by evaporation, leaving a residue of oil. A typical yield of the oil is 4.6 grams. Infrared absorption analysis of this oil shows that the weight ratio of d-γ-tocopherol to d-delta-tocopherol is typically 2.5:1.

The oil is dissolved in 20 milliliters of acetone. To this solution there is admixed at 20° C. a solution of 0.4 gram of piperazine and 10 milliliters of acetone. The resulting solution is cooled to −20° C. and held at this temperature for 24 hours. During this time a crop of crystals forms in the solution. The mother liquor is decanted from the crystals and the crystals are dissolved in diethyl ether. The ether solution is washed several times with water. The washed ether solution is then dried over anhydrous sodium sulfate and the ether removed by evaporation. The product thus obtained is an oil, a typical yield being 2 grams. A typical infrared absorption analysis of this product shows d-γ-tocopherol at a concentration of 63% by weight and d-delta-tocopherol at a concentration of only 7% by weight.

EXAMPLE 12

This example illustrates the purification of a d-α-tocopheral concentrate containing sterols.

A d-α-tocopherol concentrate containing sterols is prepared by admixing at 20° C. 0.3 gram of soybean oil sterols (about 24% by weight of stigmasterol, 70% by weight of β- and α-sitosteral and campesterol and 6% by weight of long chain hydrocarbons) with 6.6 grams of pure d-α-tocopherol, an oil. The resulting mixture is dissolved at 20° C. in 20 milliliters of acetone, giving a concentrate solution.

0.69 gram of piperazine is dissolved at 20° C. in 5 milliliters of acetone, giving a piperazine solution.

The piperazine solution is admixed at 20° C. with the concentrate solution. The temperature of the resulting solution is lowered to 0° C. and maintained at this temperature for 1 hour.

During this period of time a precipitate of solids forms in the solution. These solids are removed from the solution by filtration, washed with cold acetone and dried. These solids are piperazine complexes of the sterols. A typical melting point of the solids is 147–152° C. A typical yield of the solids under these conditions is 0.79 gram, which indicates that substantially all of the sterols have been removed from the solution.

The solution after filtration of the solids therefrom is maintained at 0° C. for 24 hours. During this period of time another precipitate of solids forms. These solids are removed from the mother liquor by filtration, washed with cold acetone and dried. These solids are the piperazine complex of $d$-$\alpha$-tocopherol. A typical melting point of the solids thus obtained is 52–54° C. A typical yield of the solids is 3.5 grams. These solids are washed with water whereupon the complex is decomposed to give $d$-$\alpha$-tocopherol oil substantially free of sterols.

EXAMPLE 13

This example illustrates the partial resolution of $dl$-$\alpha$-tocopherol synthesized from natural phytol and trimethylhydroquinone.

In this example reference is frequently made to the specific rotation $[\alpha]_D^{25°\ C.}$ of oxidation product. The oxidation product in each case is the product obtained by admixing the analytical sample of the $\alpha$-tocopherol involved with an aqueous alkaline solution of potassium ferricyanide, separating the resulting oil layer from the aqueous layer and then drying the oil. Measurement of the optical rotation of the oil is then obtained by the usual procedure. The significance of the specific rotation of oxidation product is that in the case of $d$-$\alpha$-tocopherol $[\alpha]_D^{25°\ C.}$ of oxidation product $=+3.5°$ while in the case of $dl$-$\alpha$-tocopherol $[\alpha]_D^{25°\ C.}$ of oxidation product $=0°$. Hence, a value between the limits of 0° and $+3.5°$ is a measure of the degree of resolution obtained.

4.3 grams of a $dl$-$\alpha$-tocopherol product synthesized from natural phytol and trimethylhydroquinone, which product typically has in ethanol an ultraviolet absorption value of $$E_{1\ cm.}^{1\%}\ (292\ m\mu) = 73$$

and $[\alpha]_D^{25°\ C.}$ of oxidation product $= 0°$., is dissolved in 10 milliliters of acetone. To this solution is admixed at 20° C. a solution of 0.11 gram of piperazine in 10 milliliters of acetone. The resulting solution is cooled to $-20°$ C. and maintained at this temperature for 15 hours. During this period of time a precipitate of crystalline solids forms. The precipitate is separated from the mother liquor by filtration and residual solvent removed by evaporation. A typical yield of the solids is 0.4 gram. A typical melting point of the solids is 50–51° C.

The solids are dissolved in petroleum ether and then washed with water to decompose the complexes and remove the piperazine. The petroleum ether solution is then dried over anhydrous sodium sulfate and the petroleum ether removed by evaporation. The residue is an oil. A typical yield of the oil is 0.36 gram. A typical ultraviolet absorption measurement on the oil in ethanol gives $$E_{1\ cm.}^{1\%}\ (292\ m\mu) = 76$$

Typically, $[\alpha]_D^{25°\ C.}$ of the oxidation product $=+17°$. This value indicates that the oil has a $2d,4'd,8'd$-$\alpha$-tocopherol concentration of 83% by weight.

The mother liquor after removal of the precipitate or first crop of crystals is admixed at 20° C. with 0.11 gram of piperazine and recooled to $-20°$ C. This temperature is maintained for 24 hours. During this period of time a second crop of crystals forms. The second crop of crystals is separated from the mother liquor by filtration and residual solvent removed by evaporation. A typical yield of crystals in this step is 0.18 gram.

The crystals are dissolved in petroleum ether and then washed with water. The petroleum ether solution is then dried over anhydrous sodium sulfate and the petroleum ether removed by evaporation. The residue again is an oil which the $[\alpha]_D^{25°\ C.}$ of the oxidation product indicates has a $2d,4'd,8'd$-$\alpha$-tocopherol concentration typically of 81% by weight.

After the foregoing separation of the second crop of crystals from the mother liquor, the petroleum ether is removed by evaporation from the mother liquor, leaving an oil. This product is a $2l,4'd,8'd$-$\alpha$-tocopherol concentrate. Typically, $[\alpha]_D^{25°\ C.}$ of the oxidation product $= -2.03°$.

EXAMPLE 14

This example illustrates the separation according to a process of this invention of a substantially pure $2d,4'd,8'd$-$\alpha$-tocopherol from a $dl$-$\alpha$-tocopherol such as that obtained by synthesis from natural phytol and trimethylhydroquinone.

Reference is frequently made in this example also to the specific rotation $[\alpha]_D^{25°\ C.}$ of oxidation product. For an explanation of the meaning and significance of this, see the preceding Example 12.

To 46 grams of a $dl$-$\alpha$-tocopherol synthesized from natural phytol and trimethylhydroquinone and purified by chromatography, typically giving in ethanol an ultraviolet absorption value of $$E_{1\ cm.}^{1\%}\ (292\ m\mu) = 71$$

is admixed at 20° C. a solution of 4.5 grams of piperazine and 90 milliliters of acetone. The resulting solution is cooled to $-20°$ C. and held at this temperature for 24 hours. During this period of time a precipitate of crystals is formed. The precipitate of crystals is separated from the mother liquor by filtration and by evaporation of residual solvent. A typical yield of the solid product is 35.1 grams. A sample of this product taken up in petroleum ether, washed with water and then solvent evaporated has typically a specific rotation $[\alpha]_D^{25°\ C.}$ of oxidation product $=+2.01°$, which indicates some resolution has already occurred.

The solid product is then subjected to six successive crystallization steps. In each step the crystals are dissolved at 20° C. in fresh acetone, the resulting solution then cooled to $-20°$ C. and held at this temperature for 24 hours, mother liquor removed, first by decantation and then by evaporation, from the resulting crystals. The crystal product is then weighed and a sample is removed for analysis. The sample in each case is prepared for analysis by dissolving it in petroleum ether, washing with water to decompose the complexes and removing the piperazine and then removing the solvent by evaporation to give an $\alpha$-tocopherol oil. Typical results of this successive crystallization procedure are set out in the following Table II.

*Table II*

| Crystallization Step | Volume in Milliliters of Acetone Employed | Weight in Grams of Crystalline Product | $[\alpha]_D^{25°}$ of Oxidation Product |
|---|---|---|---|
| | | | *Degrees* |
| 1 | 70.2 | 27.1 | +4.58 |
| 2 | 54.2 | 13.5 | +12.07 |
| 3 | 27.0 | 7.1 | +19.98 |
| 4 | 21.3 | 5.4 | +20.28 |
| 5 | 27.0 | 4.2 | +25.54 |
| 6 | 21.0 | 3.9 | +29.79 |

13

The crystalline product resulting from the last crystallization is taken up in diethyl ether and then water washed to decompose the complex and remove the released piperazine. The ether solution is dried over anhydrous sodium sulfate. Then, the diethyl ether is removed by evaporation whereby there is obtained an oil which is substantially pure $2d,4'd,8'd$-α-tocopherol. A typical yield of product is 3.29 grams. A typical ultraviolet absorption value of the product in ethanol is $$E_{1\text{ cm.}}^{1\%} \ (292 \ \text{m}\mu) = 72.7$$

Acetylation of a portion of the product gives a $2d,4'd,8'd$-α-tocopheryl acetate composition which typically has a specific rotation of $[\alpha]_D^{25°\text{ C.}} = +2.78°$ and in ethanol an ultraviolet absorption value of $$E_{1\text{ cm.}}^{1\%} \ (284 \ \text{m}\mu) = 42.6$$

EXAMPLE 15

This example illustrates a process according to this invention for obtaining a $2l,4'd,8'd$-α-tocopherol concentrate from $dl$-α-tocopherol synthesized from natural phytol and trimethylhydroquinone.

The steps of Example 14 are followed down through the initial crystallization step which includes the separation by filtration of the precipitate of crystals from the mother liquor. The solvent is removed by evaporation from the filtrate or mother liquor, leaving a residue of solids. These solids are dissolved in petroleum ether and the resulting solution washed with water to decompose the complexes and remove the piperazine. The washed solution is dried over anhydrous sodium sulfate and the petroleum ether removed by evaporation. There results, thereby, a crude concentrate of $2l,4'd,8'd$-α-tocopherol. A typical yield of this concentrate is 7.5 grams. A typical specific rotation $[\alpha]_D^{25°\text{ C.}}$ of the oxidation product = −6°.

This crude concentrate is admixed at 20° C. with 0.46 gram of piperazine dissolved in 75 milliliters of acetone. The resulting solution is cooled to −20° C. and maintained at this temperature for 24 hours, resulting in a crop of crystals. The mother liquor is separated from this crop of crystals by filtration and then by evaporation. A typical yield of crystals is 1.7 grams. A sample of the crystals is washed with water to release the tocopherol and analyzed. Typically, the specific rotation $[\alpha]_D^{25°\text{ C.}}$ of the oxidation product = −11.5°. The crystals are dissolved in 8.5 milliliters of fresh acetone at 20° C. The resulting solution is then cooled to −20° C. and maintained at this temperature for 24 hours whereby a crop of crystals is obtained. The mother liquor is decanted from the crystals, and then evaporated therefrom. The crystals are dissolved in diethyl ether, washed with water to decompose the complexes and remove the released piperazine. The washed diethyl ether solution is dried over anhydrous sodium sulfate and the solvent removed by evaporation. Thus there is obtained a $2l,4'd,8'd$-α-tocopherol concentrate. A typical yield is 1.1 grams. A typical specific rotation $[\alpha]_D^{25°\text{ C.}}$ of the oxidation product is −15.2°, thereby indicating the concentration of $2l,4'd,8'd$-α-tocopherol is 73.3% by weight.

Thus, there are provided crystalline complexes of 6-chromanols and piperazines. In addition, there is provided a method for readily resolving $dl$-α-tocopherol that is a racemic mixture of two simple optical isomers. Moreover, there is provided a process for separating one 6-chromanol from another and for purifying 6-chromanols.

Other advantages, benefits and embodiments will be apparent to those in the exercise of ordinary skill in the art after reading the foregoing disclosure. In this regard, while this invention has been described in considerable detail relative to certain specific embodiments thereof, variations and modifications of these embodiments can be effected within the spirit and scope of the invention as disclosed and claimed.

The embodiments of the invention in which an exclusive property or privilege is claimed are defined as follows:

1. A complex of a 6-chromanol and a piperazine compound selected from the group consisting of piperazine and C-methyl and C-ethyl substituted piperazine said 6-chromanol having the formula:

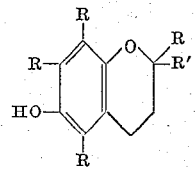

wherein each R is a radical independently selected from the group consisting of hydrogen and methyl radicals and R' is selected from the group consisting of hydrogen and aliphatic saturated hydrocarbon radicals having 1–16 carbon atoms.

2. A complex of 2,2,5,7,8-pentamethyl-6-chromanol and piperazine.

3. A complex of a tocopherol and a piperazine compound selected from the group consisting of piperazine and C-methyl and C-ethyl substituted piperazines, said tocopherol having the formula:

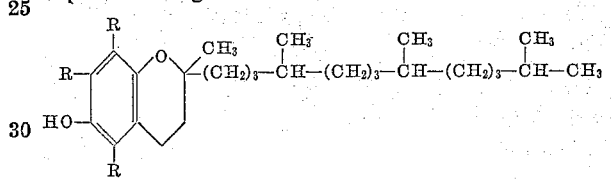

wherein each R is a radical independently selected from the group consisting of hydrogen and methyl radicals.

4. A complex of α-tocopherol and piperazine.
5. A complex of $d$-α-tocopherol and piperazine.
6. A complex of $2d,4'd,8'd$-α-tocopherol and piperazine.
7. A complex of $2l,4'd,8'd$-α-tocopherol and piperazine.
8. A complex of $d$-α-tocopherol and 2-methyl-piperazine.
9. A complex of $d$-α-tocopherol and trans-2,5-dimethyl-piperazine.
10. A complex of γ-tocopherol and piperazine.
11. A complex of zeta-tocopherol and piperazine.
12. A complex of delta-tocopherol and piperazine.
13. A process for making a complex of a 6-chromanol according to the general formula:

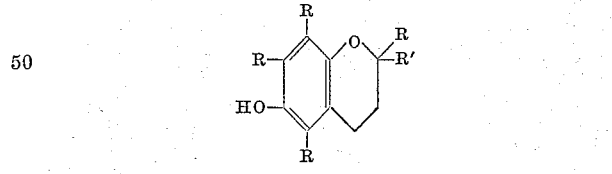

wherein each R is a radical independently selected from the group consisting of hydrogen and methyl radicals and R' is a radical selected from the group consisting of hydrogen and aliphatic, saturated and unsaturated hydrocarbon radicals, and a piperazine compound selected from the group consisting of piperazine and C-methyl and C-ethyl substituted piperazines, which comprises: admixing under substantially anhydrous conditions said 6-chromanol and said piperazine compound.

14. A process for making a complex of a tocopherol according to the formula:

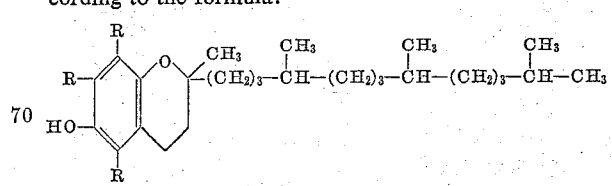

wherein each R is a radical independently selected from the group consisting of hydrogen and methyl radicals, and a piperazine compound selected from the group consisting of piperazine and C-methyl and C-ethyl substituted piperazines, which comprises: admixing under substantially anhydrous conditions said tocopherol and said piperazine compound.

15. A process for making a complex of a tocopherol according to the formula:

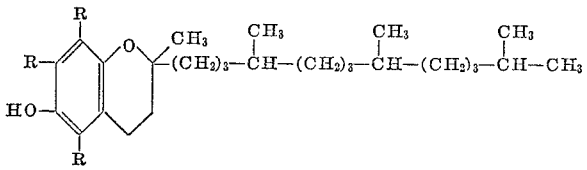

wherein each R is a radical independently selected from the group consisting of hydrogen and methyl radicals, and a piperazine compound selected from the group consisting of piperazine and C-methyl and C-ethyl substituted piperazines, which comprises: admixing under substantially anhydrous conditions in a crystallization solvent for said complex said tocopherol and said pierazine compound; whereby a solution containing said complex is formed, changing the temperature of said solution to a temperature at which the solubility of said complex in said solution is substantially less, whereby crystals of said complex are formed; and separating said crystals from said solution.

16. A process for making a complex of a tocopherol according to the formula:

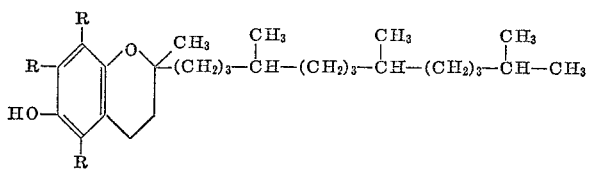

wherein each R is a radical independently selected from the group consisting of hydrogen and methyl radicals, and a piperazine compound selected from the group consisting of piperazine and C-methyl and C-ethyl substituted piperazines, which comprises: admixing under substantially anhydrous conditions in acetone at a temperature in a range from about 0 to about 55° C. said tocopherol and said piperazine compound at a mole ratio of said tocopherol to said piperazine compound of about 2:1, whereby an acetone solution containing said complex is formed; lowering the temperature of said solution to a temperature in a range from about —40 to about 0° C., whereby crystals of said complex are formed; and separating said crystals from said solution.

17. A process for making a complex of an α-tocopherol and a piperazine compound selected from the group consisting of piperazine and C-methyl and C-ethyl substituted piperazines, which comprises: admixing under substantially anhydrous conditions in acetone at a temperature in a range from about 0 to about 55° C. said tocopherol and said piperazine compound at a mole ratio of said tocopherol to said pierazine compound of about 2:1, whereby an acetone solution containing said complex is formed; lowering the temperature of said solution to a temperature in a range from about —40 to about 0° C. whereby crystals of said complex are formed; and separating said crystals from said solution.

18. A proces for making a complex of a d-α-tocopherol and a piperazine compound selected from the group consisting of piperazine and C-methyl and C-ethyl substituted piperazines, which comprises: admixing under substantially anhydrous conditions in acetone at a temperature in a range from about 0 to about 55° C. said tocopherol and said piperazine compound at a mole ratio of said tocopherol to said perazine compound of about 2:1, whereby an acetone solution containing said complex is formed; lowering the temperature of said solution to a temperature in a range from about —40 to about 0° C. whereby crystals of said complex are formed; and separating said crystals from said solution.

References Cited in the file of this patent
UNITED STATES PATENTS

| | | |
|---|---|---|
| 2,349,274 | Hickman | May 23, 1944 |
| 2,801,254 | Lappin et al. | July 30, 1957 |
| 2,909,523 | Bach et al. | Oct. 20, 1959 |
| 2,927,924 | Mills | Mar. 8, 1960 |
| 2,969,365 | Levis | Jan. 24, 1961 |
| 2,988,553 | Kussner et al. | June 13, 1961 |
| 2,992,235 | Green et al. | July 11, 1961 |